No. 828,264. PATENTED AUG. 7, 1906.
J. F. APPLEBY.
COTTON HARVESTING MACHINE.
APPLICATION FILED JAN. 8, 1906.

No. 828,264. PATENTED AUG. 7, 1906.
J. F. APPLEBY.
COTTON HARVESTING MACHINE.
APPLICATION FILED JAN. 8, 1906.

Witnesses:
G. A. Tauberschmidt
W. B. Stone

Inventor:
John F. Appleby
By G. L. Grogg
Attorney.

No. 828,264. PATENTED AUG. 7, 1906.
J. F. APPLEBY.
COTTON HARVESTING MACHINE.
APPLICATION FILED JAN. 8, 1906.

Witnesses:
G. A. Daubenschmidt
W. B. Stone

Inventor:
John F. Appleby
By G. L. Cragg
Attorney

No. 828,264. PATENTED AUG. 7, 1906.
J. F. APPLEBY.
COTTON HARVESTING MACHINE.
APPLICATION FILED JAN. 8, 1906.

Witnesses:
G. A. Pauberschmidt
M. B. Stone

Inventor:
John F. Appleby
By G. L. Cragg
Attorney

UNITED STATES PATENT OFFICE.

JOHN F. APPLEBY, OF CHICAGO, ILLINOIS, ASSIGNOR TO DIXIE COTTON PICKER CO., OF REDFIELD, SOUTH DAKOTA, A CORPORATION OF SOUTH DAKOTA.

COTTON-HARVESTING MACHINE.

No. 828,264.     Specification of Letters Patent.     Patented Aug. 7, 1906.

Application filed January 8, 1906. Serial No. 295,100.

*To all whom it may concern:*

Be it known that I, JOHN F. APPLEBY, a citizen of the United States, residing at Chicago, in the county of Cook and State of Illinois, have invented a certain new and useful Improvement in Cotton-Harvesting Machines, of which the following is a full, clear, concise, and exact description, reference being had to the accompanying drawings, forming a part of this specification.

My invention relates to cotton picking or harvesting machines.

Features of the cotton-harvesting machine herein disclosed form the subject-matter of my divisions of this application, Serial No. 311,591, filed April 13, 1906, and Serial No. 311,592, filed April 13, 1906.

In operating cotton-picking machines in the field I have discovered that a serious impediment to the effectiveness of the picking mechanism is present because of the readiness with which the picking-fingers would gather foreign material, such as sap or moisture, that would impair the efficiency of the fingers, and I know of no practical machine prior to the conception of my present invention that included means whereby the foreign matter could be sufficiently prevented from impairing the efficiency of the picking mechanism in this regard.

It has been proposed to employ brushes whose function it was to remove such foreign material after it had found lodgment upon the picking-fingers; but upon reflection it will be apparent that the brushes would not long perform the service for which they were intended, because in the course of a short time the brushes themselves would become clogged with the foreign matter, requiring them to be cleaned in turn. In the construction mentioned it was the purpose to have 'the cleaning-brushes perform their function intermittently, the brushes being normally out of the path of the picking-fingers and only swung into the path of the picking-fingers when the fingers were to be freed of accumulated foreign matter. The adjustment of the brushes was manually accomplished, and such adjustment was effected when it suited the discretion of the operator of the particular machine. It will be seen that even though the brushes for a time were instrumental in performing their functions that the time these functions were performed wholly depended upon the intelligence and discretion of the man in charge of the machine, and he having many other duties to perform would in many cases not be likely to notice the need of a finger-cleaning operation until the picking-fingers became so clogged as to be ineffective for further picking.

It is one of the main objects of my invention to provide a preventive for the condition spoken of, to which end I do not employ any cleaning-brushes, which in themselves have to be cleaned from time to time, but I employ means for placing the picking-fingers in a condition that will prevent the lodgment of the hurtful foreign material or so modify the action of this foreign material that it will not cause the picking-fingers to fail in their purpose.

In practicing my invention I employ a material which when applied to the picking-fingers will permit the cotton to be properly stripped from the fingers, such material either preventing the permanent lodgment of the deleterious foreign matter upon the picking-fingers or so modifying the action of such foreign matter that the latter material will not tend to hold the cotton in place upon the fingers. The material that I prefer to employ for the purpose is oil, the particular kind of oil being preferably kerosene, and I provide a device whereby this kerosene is placed upon the fingers. This device preferably includes a receptacle for the material to be applied to the fingers and a conveyer leading from the receptacle toward the fingers, which conveyer desirably contacts with the fingers in effecting the application of the material thereto, this conveyer desirably passively transferring the kerosene or oil to the picking-fingers without appreciably brushing or scraping any lodged foreign material from the fingers. In the operation of the harvester in the fields the coating is preferably applied after the fingers have been stripped of their cotton and before the entry of the fingers into the bushes. The conveyer in the machine is desirably formed of ordinary wicks that project into the oil-receptacle and which extend between the rows of picking-fingers and canvas upon which the wicks rest, the canvas being slit in the planes of movement of the picking-fingers, so that as said fingers are bodily moved they pass through the slits in the canvas, the canvas thereupon effecting the application of the oil to the fingers. The contact of the conveyer upon the fingers is extremely light, so that no appreciable additional mechanical load is imposed upon the machine.

In the preferred embodiment of the invention the oil or other suitable material is coated upon the picking-fingers while the machine is operating in the field, though obviously such material may be applied before the machine is picking cotton.

I will explain my invention more fully by reference to the accompanying drawings, illustrating one of the embodiments thereof, the embodiment illustrated being that which is preferred.

In the drawings.

Like parts are indicated by similar characters of reference throughout the different figures.

The picking, stripping, and cleaning mechanism hereinafter to be particularly specified is mounted within a casing or housing 1, that desirably has a porch 2, upon which a basket 3, that is to receive the picked cotton, is placed. A skirt or gatherer formed in two sides 6 is provided at the base of the casing for the purpose of laterally gathering the cotton-bushes to be within range of the picking mechanism to be described. An apron 7 is mounted at the front of the machine a sufficient distance above the bottom edges of the skirt or gatherer to depress the bushes to a uniform level, and a substantially horizontal grate 8, composed of longitudinally-disposed bars, is continued from the lower margin of the apron 7 rearwardly, so that the level to which the bushes have been depressed may be maintained during the picking operation. A single pair of traction-wheels 9 9 is desirably only employed, upon which the casing is mounted in a manner to be hereinafter set forth.

In order that the casing, together with the grate 8, the picking mechanism, and other associate parts, may be raised and lowered, I preferably employ the mechanism now to be described. The wheels 9 9 are mounted upon a U-shaped axle 10, the U of the axle being inverted. Guides 11 11 are fixed with respect to the side walls 12 12 of the casing. By vertical movement of these guides upon the vertical parts of the U-shaped axle the casing and the mechanism carried thereby are elevated or lowered.

Links 13 are anchored to the casing and terminate at their free ends in hooks that pass through arms 14, that are rigidly secured to a shaft 15, the shaft being journaled in bearings 16, that are mounted upon a cross-girder 17, stationary with respect to the axle. A hand-lever 18 is rigidly secured to the shaft 15, desirably at one end of said shaft, this hand-lever carrying a locking-detent 19, a detent-rod 20, and a grip 21, which may be operated to actuate the rod 20 to release the locking-detent 19 from the locking quadrant or rack 22, this releasing action being effected against the force of a spring 23, provided normally to hold the detent and quadrant in locking relation. By rotating the lever 18 the links 13 may be elevated and lowered to effect the corresponding elevation or depression of the casing. In order that physical effort may be reduced in raising and lowering the casing, I desirably provide a spring mechanism that exerts a lifting action when the locking-detent 19 is disengaged from the quadrant 22. This spring mechanism desirably includes two oppositely-wound helices 24, of strong steel rod, which thus constitute coiled springs, one coiled spring terminating in a hook 25, while the companion coiled spring terminates in an eye 26. A tension adjusting-rod 27 terminates at one end in an eye by which said rod is engaged with the hook 25, the other end of the rod 27 having threaded thereupon an adjusting-nut, the threaded end of the rod 27 passing through the eye 26, the nut serving to adjust the space between the portions 25 26. The coiled springs are wound about cores 28, that are carried by the girder 17, and each coiled spring has an outwardly-extending hook 29, that is connected with a link 20, attached at its lower end to the casing.

It will be seen that when the elements 19 22 are separated the casing is carried by the coiled springs 24 by reason of the engagement of the portions 29 of said springs with the links 20, so that the operator, who may remain upon his seat, may have little difficulty in raising or lowering the casing. The extent to which the springs 24 counteract the weight of the casing is determined by the adjustment effected by the adjusting device 27.

The picking, stripping, and cleaning mechanism is operated from a main shaft 30, that is driven by the sprocket-gears 31, located at its outer ends and rotated by the sprocketchains 32, operated by the sprocket-wheels 33, there being one such sprocket-wheel 33 directly coupled and coaxial with each traction-wheel.

In order that the single shaft 30 may be in driven connection with both traction-wheels and at the same time permit one of the traction-wheels to move faster than the other, as in making turns, the said shaft 30 is made in sections united by a differential gear 34.

A third sprocket-wheel 35 may constitute the frame that carries the gears 36, that form component parts of the gearing 34, in a manner well understood by those skilled in the art, for it is by such an arrangement that said sprocket-wheel 35 may be rotated through the agency of both sections of the shaft 30 whether said sections are rotating at the same or different speeds. The sprocket-wheel 35 drives a sprocket-chain 37, that in turn rotates a sprocket-gear 38, which directly causes the operation of the picking, stripping, and cleaning mechanism, as will be described.

As hitherto stated, the sprocket-wheel 38 is the direct cause of the operation of the pickers, strippers, and cleaners, the shaft 39 directly operating the picking mechanism, as will be specified, the sprocket-gear 40 upon said shaft 39 operating the sprocket-chain 41, that in turn rotates the sprocket-gear 45, mounted upon a shaft 43, upon which shaft are fixed the strippers 44. Where cleaners are employed, the shaft 43 may have mounted thereon a sprocket-wheel 42, that operates the sprocket-chain 46, which sprocket-chain causes the rotation of a sprocket-wheel 47, fixed upon a shaft 48, upon which shaft are also fixed cleaning elements 49 in the form of wheels, one for each stripping-cylinder slot. The cotton that is picked and cleaned is passed through an opening 50 into the basket below the opening. The apron 50' holds the cotton in the path of the packer. The cotton when it reaches a suitable height in the basket is packed by the packing-spiral 52, which is rotated by a shaft 53, that is flexibly coupled by the flexible joint 54 with a sleeve 55, movable back and forth upon and rotating with a shaft 56, that carries a bevel-gear 57, adapted to mesh with the bevel-gear 58, splined upon the driving-shaft 30. The shaft 53 works within a sleeve 59, that is anchored and held at 60 60 upon the porch 4, said shaft being longitudinally movable in said sleeve 59, so that the packing-spiral may be thrust upward as the cotton within the basket is being packed, the packing-spiral thereby automatically accomodating itself to the changing level of the cotton. When sufficient cotton has been packed within the basket, the packing-spiral 52 is raised by the gathered cotton to such an extent that the collar 61, fast upon the shaft 53, engages the cam end 62 of the bell-clapper 63 to cause the said clapper to strike the gong 64. The operator (the driver) of the machine will then have his attention called to the fact that a basket has been filled, whereupon the filled basket may be removed and a fresh basket substituted. By providing the sleeve and shaft construction 55 56 and the flexible joint 54 it is obvious that the angular relations of the shaft 56 53 may be changed according to the quantity of cotton contained in the basket, and in order that the shaft 56 may accommodate itself to this operation it is provided with a hub extension 65, which is capable of rotation about the shaft 30 as the shaft 56 is raised and lowered. It will be seen that the packing-spiral is operated by the shaft 30, and therefore by the vehicle-wheels of the machine.

I do not deem it necessary herein to specifically describe the construction and operation of the picking mechanism, stripping mechanism, and the cleaning mechanism, as such mechanism is preferably that disclosed in my patent of the United States of America numbered 798,651, dated September 5, 1905.

Figure 1:
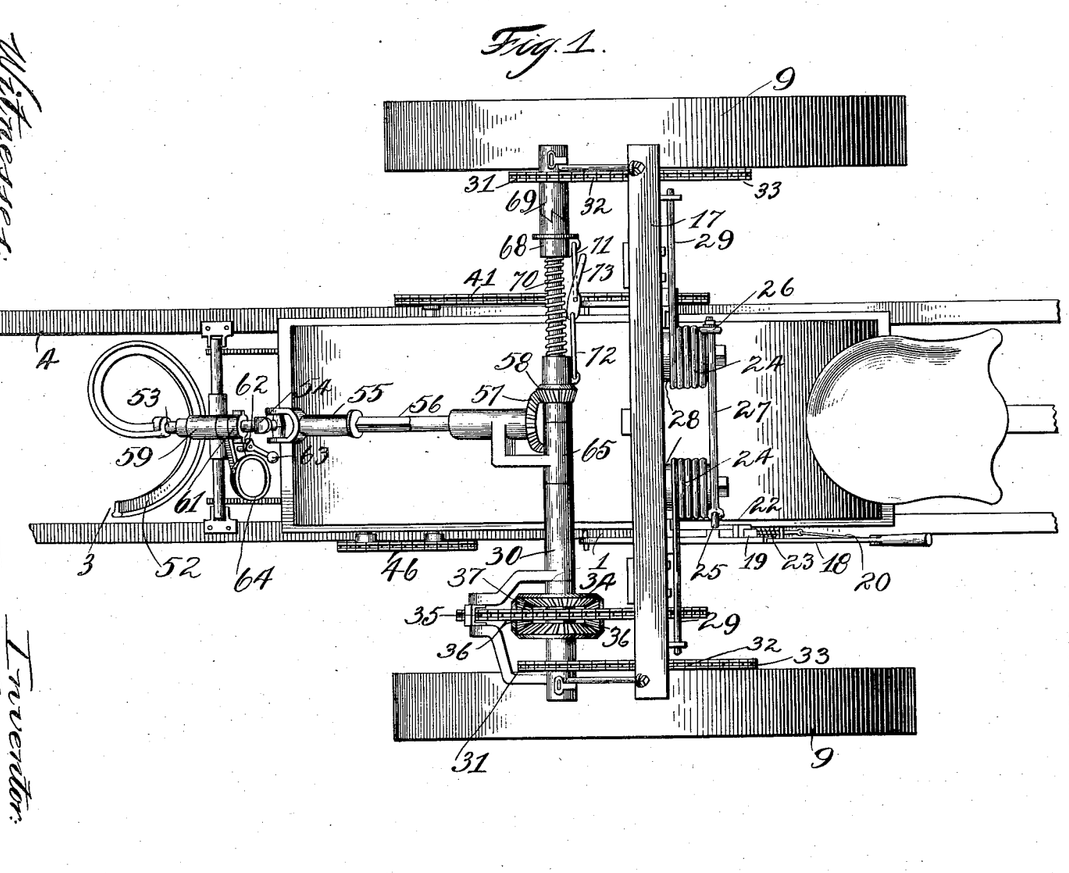
Figure 1 is a plan view illustrating so much of the mechanism as is necessary to an understanding of the invention.
Figure 2:
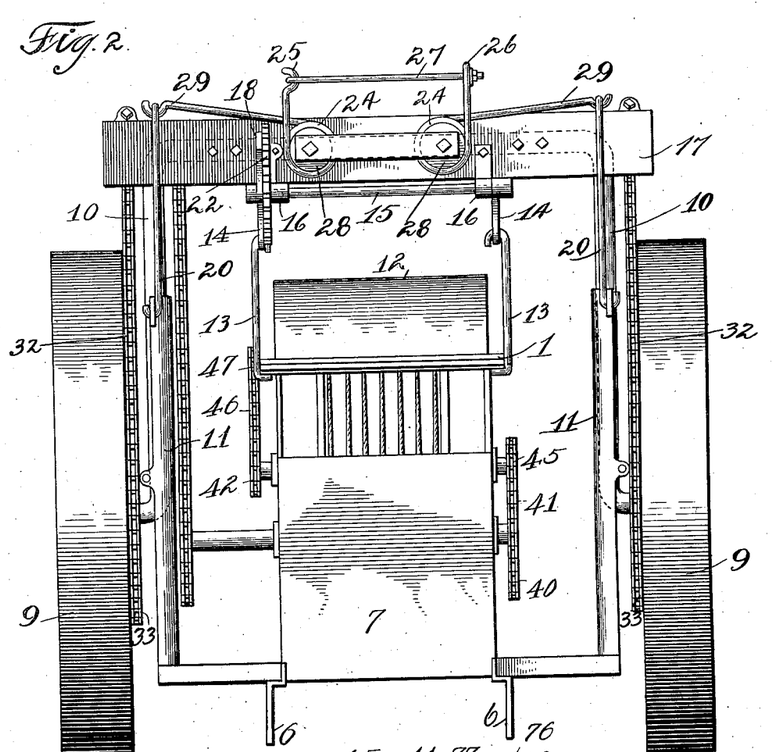
Fig. 2 is a view from the front of part of the mechanism entering into the machine.
Figure 3:
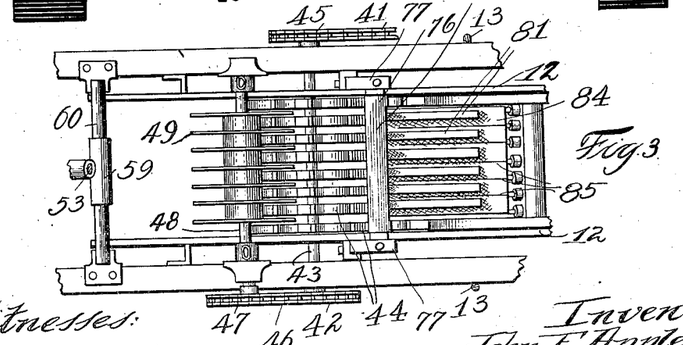
Fig. 3 is a view in plan of a part of the mechanism.
Figure 4:
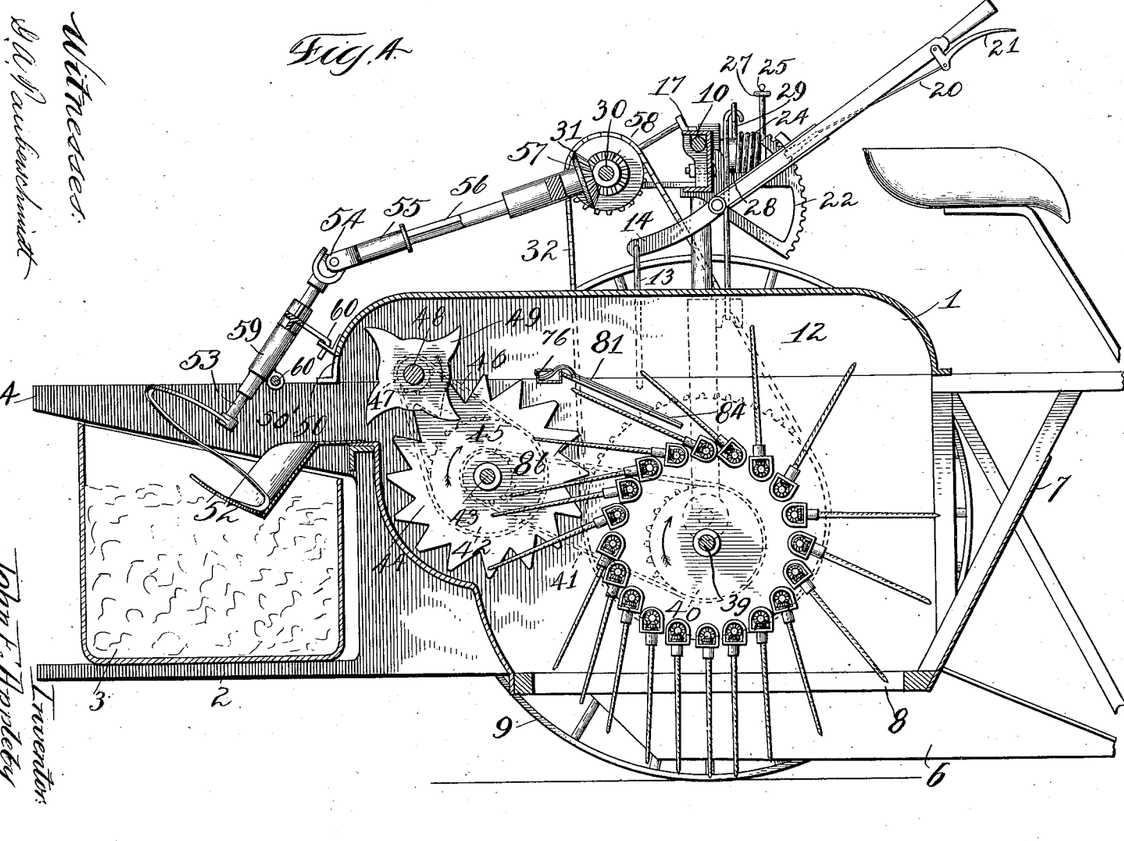
Fig. 4 is a longitudinal section in elevation illustrating certain parts of the machine.
Figure 5:
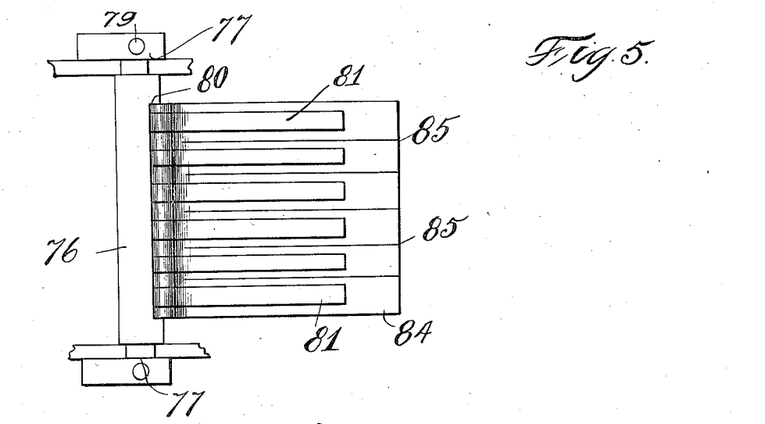
Fig. 5 is a view in plan, illustrating the oiling device.
Figure 6:
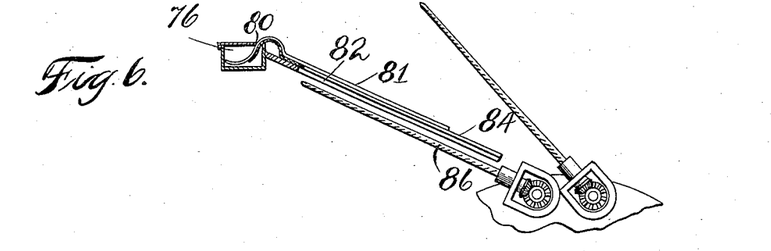
Fig. 6 is a view in sectional elevation of the oiling device.
Figure 7:
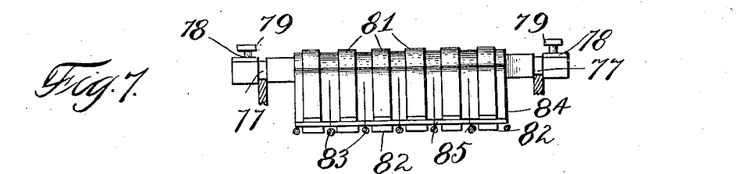
Fig. 7 is an end view of the oiling device.
Figure 8:
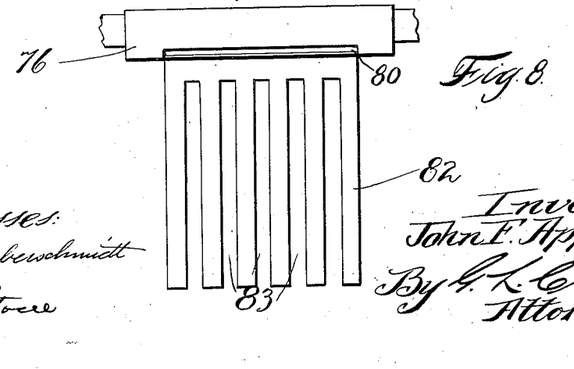
Fig. 8 is a plan view of a portion of the oiling device, showing particularly the support for the wicking.
Figure 9:
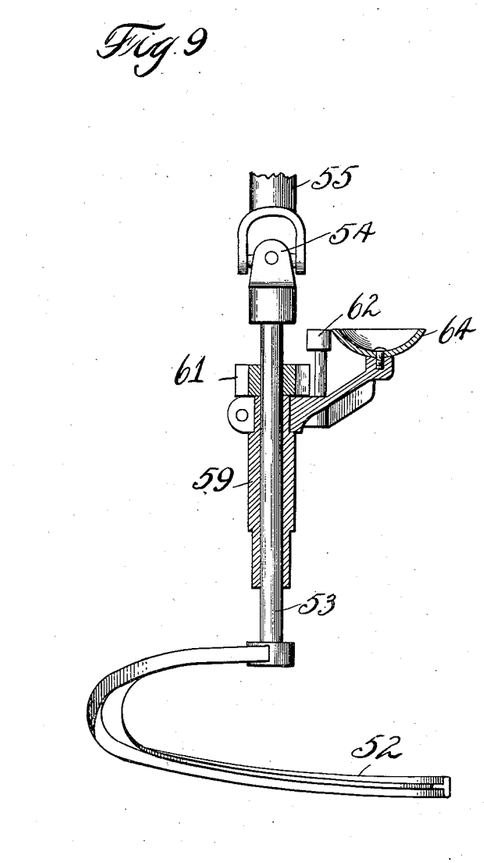
Fig. 9 is a view, partially in section, illustrating the packing mechanism.
Figure 10:
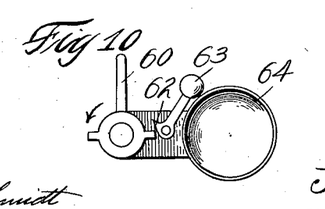
Fig. 10 is a detail view of the alarm mechanism.
Figure 11:
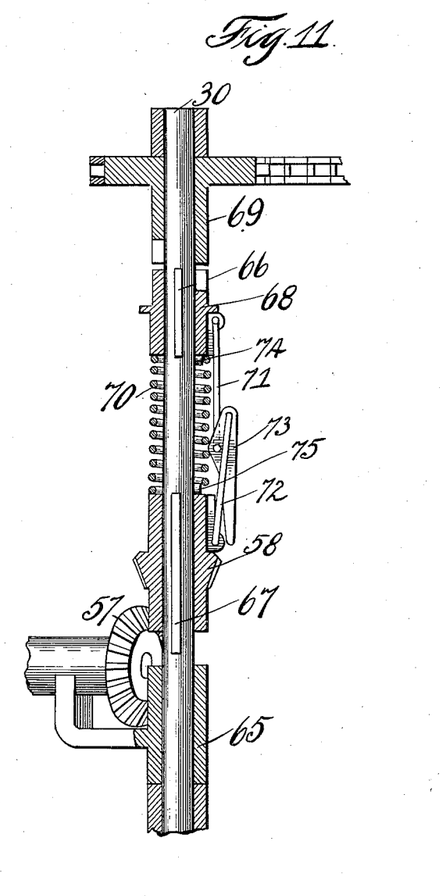
Fig. 11 is a view illustrating the clutching mechanism.

Whenever it is desired to stop the operation of the packing mechanism, picking, stripping, and cleaning mechanism, I desirably employ a clutch mechanism. (Illustrated very clearly in Fig. 11.) The shaft 30 is provided with splines 66 67, which force the rotation of the clutch-collar 68 and the bevel-pinion 58. The clutch-collar 68 when in its outermost position engages a companion clutch element 69, that determines the operation of the mechanism carried by the casing. The bevel-gear 58 when thrust to an outer position engages the bevel-gear 57, whereby the operation of the packing device may be effected. A spring 70 when not counteracted maintains the elements 58 68 in their outermost position by exerting a spreading action between said elements. In order that the elements 68 58 may be moved toward each other, I employ two links 71 72 and a handle 73, to which said links are pivoted at different places, said handle when in the position shown in Fig. 11 drawing the elements 58 68 toward each other against the action of the spring 70. When the handle 73 is reversed in position, as shown in Fig. 1, the spring 70 acts to thrust the elements 58 68 apart for the purpose specified. In order that neither element 58 68 may be moved too far when the handle 73 is being placed in the position shown in Fig. 11 and in order that the disengagement of both of said elements from their companions may be insured, I provide lugs 74 75, that limit the inward movement of said elements.

I prefer to place the coating of kerosene or other suitable material upon the picking-fingers while they are being bodily moved, but also while they are not rotating about their individual axes, though I do not wish to be limited to the location of the oiling device. As oil is the material that I prefer to place upon the fingers to maintain the fingers in condition to pick the cotton, I employ an oil-receptacle 76, that is mounted upon the inner faces of the side walls of the casing, this receptacle being desirably in the form of an elongated box or trough which is provided with stub-shafts 77, contained within bearings 78, set-screws 79 being employed to hold the receptacle 76 in any position to which it may be turned in its bearings. The receptacle 76 has an opening 80, into which strips of wicking 81 project, these strips of wicking being supported by a plate 82, that is provided with slots 83, located in the planes of movement of the picking-fingers, the wicking resting upon the portions of the plate 82 between the said slots 83. The wicking constitutes a conveyer for the oil; but in order that the flow of the oil may not be too copious I supplement the kind of wicking usually found upon the market with a sheet of canvas 84, which constitutes a part or continuation of the wicking, this strip of canvas being slit at 85 in the planes of movement of the picking-fingers, (the slits 85 lying midway between the sides of the corresponding slots 83,) so that as the picking-fingers bodily move they may pass through the slits and in passing they sufficiently coat the fingers with oil for the purpose that has been hitherto specified. The oil is thus placed upon the fingers by contact with the wicking, (preferably composed of the portions 81 84, that have been specified,) though I do not wish to be limited to the form of conveyer 81 84 employed in transferring the oil from the receptacle to the fingers. The trough or receptacle 76 is desirably mounted above the stripping mechanism 44, and the wicking desirably slopes downwardly and forwardly in such a direction that the picking-fingers 86 as they pass through the slits 85 are substantially parallel to the plane occupied by the wicking, whereby substantially the entire length of each finger (whose teeth project downwardly as they are being coated) has kerosene applied thereto.

While I prefer the location of the oil-receptacle and the disposition of the wicking shown, I do not wish to be limited thereto, nor do I wish to be limited to kerosene-oil as the material with which the picking-fingers are to be coated As disclosed in the aforesaid patent, the picking-fingers travel bodily in vertical planes and longitudinally of the vehicle, these picking-fingers rotating about their own axes while picking the cotton and being held from such rotation during the major portion of the balance of their travel.

In the claims I speak of "coating" or otherwise applying the oil to the cotton-picking fingers, meaning thereby, of course, that the oil (or other material) is applied to portions of the fingers that project into the cotton-plants.

While I have herein shown the adaptation of my invention to the type of machine disclosed in my aforesaid patent and have herein illustrated preferred embodiments of various features of the invention, I do not wish to be limited to the construction shown, as changes may readily be made therein without departing from the spirit of the invention; but,

Having thus described my invention, I claim as new and desire to secure by Letters Patent—

1. A cotton-picking machine including cotton-picking fingers, a receptacle for oil, a conveyer for leading the oil from the receptacle to the fingers, said conveyer serving to contact with the fingers, thereby to apply the oil thereto, said conveyer including wicking projecting into the oil in the receptacle, said wicking being slit in the planes of movement of the fingers, the fingers passing through the slits in said conveyer, the portion of the wicking that is slit being formed of canvas, and a plate supporting the wicking, said plate being slotted in the planes of movement of the fingers.

2. A cotton-picking machine including cotton-picking fingers, a receptacle for oil, a conveyer for leading the oil from the receptacle to the fingers, said conveyer including wicking projecting into the oil in the receptacle, said wicking being slit in the planes of movement of the fingers, the fingers passing through the slits in said conveyer, the portion of the wicking that is slit being formed of canvas, and a plate supporting the wicking, said plate being slotted in the planes of movement of the fingers.

3. A cotton-picking machine including cotton-picking fingers, a receptacle for oil, a conveyer for leading the oil from the receptacle to the fingers, said conveyer serving to contact with the fingers, thereby to apply the oil thereto, said conveyer including wicking projecting into the oil in the receptacle, said wicking being slit in the planes of movement of the fingers, the fingers passing through the slits in said conveyer, and a plate supporting the wicking, said plate being slotted in the planes of movement of the fingers.

4. A cotton-picking machine including cotton-picking fingers, a receptacle for oil, a conveyer for leading the oil from the receptacle to the fingers, said conveyer including wicking projecting into the oil in the receptacle, said wicking being slit in the planes of movement of the fingers, the fingers passing through the slits in said conveyer, and a plate supporting the wicking, said plate being slotted in the planes of movement of the fingers.

5. A cotton-picking machine including cotton-picking fingers, a receptacle for oil, a conveyer for leading the oil from the receptacle to the fingers, said conveyer serving to contact with the fingers, thereby to apply the oil thereto, said conveyer including wicking projecting into the oil in the receptacle, and a plate supporting the wicking, said plate being slotted in the planes of movement of the fingers.

6. A cotton-picking machine including cotton-picking fingers, a receptacle for oil, a conveyer for leading the oil from the receptacle to the fingers, said conveyer including wicking projecting into the oil in the receptacle, and a plate supporting the wicking, said plate being slotted in the planes of movement of the fingers.

7. A cotton-picking machine including cotton-picking fingers, a receptacle for oil, and a conveyer leading the oil from the receptacle to the fingers, said conveyer serving to contact with the fingers, thereby to apply oil thereto, said conveyer including wicking projecting into the oil in the receptacle, said wicking being slit in the planes of movement of the fingers, the fingers passing through the slits in said conveyer, the portion of the wicking that is slit being formed of canvas.

8. A cotton-picking machine including cotton-picking fingers, a receptacle for oil, and a conveyer for leading the oil from the receptacle to the fingers, said conveyer including wicking projecting into the oil in the receptacle, said wicking being slit in the planes of movement of the fingers, the fingers passing through the slits in said conveyer, the portion of the wicking that is slit being formed of canvas.

9. A cotton-picking machine including cotton-picking fingers, a receptacle for oil, and a conveyer for leading the oil from the receptacle to the fingers, said conveyer serving to contact with the fingers, thereby to apply the oil thereto, said conveyer including wicking projecting into the oil in the receptacle, said wicking being slit in the planes of movement of the fingers, the fingers passing through the slits in said conveyer.

10. A cotton-picking machine including cotton-picking fingers, a receptacle for oil, and a conveyer for leading the oil from the receptacle to the fingers, said conveyer including wicking projecting into the oil in the receptacle, said wicking being slit in the planes of movement of the fingers, the fingers passing through the slits in said conveyer.

11. A cotton-picking machine including cotton-picking fingers, a receptacle for oil, and a conveyer for leading the oil from the receptacle to the fingers, said conveyer serving to contact with the fingers, thereby to apply the oil thereto, said conveyer including wicking projecting into the oil in the receptacle.

12. A cotton-picking machine including cotton-picking fingers, a receptacle for oil, and a conveyer for leading the oil from the receptacle to the fingers, said conveyer including wicking projecting into the oil in the receptacle.

13. A cotton-picking machine including cotton-picking fingers, a receptacle for oil, and a conveyer for leading the oil from the receptacle to the fingers, said conveyer serving to contact with the fingers, thereby to apply the oil thereto.

14. A cotton-picking machine including cotton-picking fingers, a receptacle for oil, and a conveyer for leading the oil from the receptacle to the fingers.

15. A cotton-picking machine including cotton-picking fingers, a receptacle for oil, and means for coating the oil upon the fingers.

16. A cotton-picking machine including cotton-picking fingers, and means for applying material carried by the machine to said fingers.

17. A cotton-picking machine including cotton-picking fingers, a receptacle for oil, and a device for applying said oil to the fingers.

18. A cotton-picking machine including cotton-picking fingers, a receptacle, and a device for transferring material from said receptacle to the fingers.

19. A cotton-picking machine including cotton-picking fingers, a receptacle for oil, and wicking for transferring the oil to the fingers, said fingers engaging substantially throughout their length said wicking in the movement of said fingers, whereby the fingers are coated with oil.

20. A cotton-picking machine including cotton-picking fingers, a receptacle for oil, and wicking for transferring the oil to the fingers, said fingers engaging said wicking in the movement of said fingers, whereby the fingers are coated with oil.

21. A cotton-picking machine including cotton-picking fingers, a receptacle for oil, and wicking for transferring the oil to the fingers, said fingers engaging substantially throughout their length said wicking in the movement of said fingers, whereby the fingers are coated with oil, said wicking being slit in the planes of movement of said fingers to effect the application of the wicking to the fingers.

22. A cotton-picking machine including cotton-picking fingers, a receptacle for oil, and wicking for transferring the oil to the fingers, said fingers engaging said wicking in the movement of said fingers, whereby the fingers are coated with oil, said wicking being slit in the planes of movement of said fingers to effect the application of the wicking to the fingers.

23. A cotton-picking machine including picking-fingers, and a conveyer for transferring material carried by the machine to said fingers.

24. A cotton-picking machine including cotton-picking fingers, and wicking, said wicking being slit in the planes and paths of movement of the fingers.

25. A cotton-picking machine including cotton-picking fingers, and wicking contacting with the fingers.

26. A cotton-picking machine including cotton-picking fingers, and a device for applying oil to the fingers.

In witness whereof I hereunto subscribe my name this 29th day of December, A. D. 1905.

JOHN F. APPLEBY.

Witnesses:
   G. L. CRAGG,
   W. B. STONE.